(12) United States Patent
Kunert et al.

(10) Patent No.: US 6,511,096 B1
(45) Date of Patent: Jan. 28, 2003

(54) SUBFRAME FOR A MOTOR VEHICLE

(75) Inventors: Reinhard Kunert, Weissach (DE); Wilhelm Frasch, Oberboihingen (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/520,011

(22) Filed: Mar. 6, 2000

(30) Foreign Application Priority Data

Mar. 6, 1999 (DE) .......................................... 199 09 945

(51) Int. Cl.⁷ .............................................. B62D 21/12
(52) U.S. Cl. ............................... 280/785; 280/124.109; 280/781; 280/790
(58) Field of Search ................................ 280/687, 781, 280/785, 788, 790, 791, 792, 795, 796, 797, 124.109

(56) References Cited

U.S. PATENT DOCUMENTS

| | | | | |
|---|---|---|---|---|
| 3,252,211 A | * | 5/1966 | Lindstrom | |
| 4,263,980 A | * | 4/1981 | Harlow, Jr. et al. | 180/292 |
| 4,768,808 A | * | 9/1988 | DeRees | 280/796 |
| 4,955,664 A | * | 9/1990 | Friedrich | 296/204 |
| 5,240,279 A | * | 8/1993 | Kunert | 280/673 |
| 5,280,957 A | * | 1/1994 | Hentschel | 280/788 |
| 5,411,308 A | * | 5/1995 | Kreis et al. | 296/30 |
| 5,472,063 A | * | 12/1995 | Watanabe et al. | 180/274 |
| 5,562,308 A | | 10/1996 | Kamei et al. | |
| 5,611,569 A | * | 3/1997 | Sekiguchi et al. | 280/788 |
| 5,622,382 A | * | 4/1997 | Zepnik et al. | 280/756 |

FOREIGN PATENT DOCUMENTS

| | | | |
|---|---|---|---|
| DE | 41 29 538 C2 | | 3/1993 |
| DE | 004135361 | * | 4/1993 |
| DE | 19703951 | | 8/1997 |
| DE | 10007790 | | 8/2001 |
| WO | WO96/19373 | | 6/1996 |

* cited by examiner

*Primary Examiner*—Eric Culbreth
(74) *Attorney, Agent, or Firm*—Crowell & Moring LLP (57) ABSTRACT

A subframe for a motor vehicle, particularly for a rear axle of a motor vehicle, includes of a chassis frame which can be fastened to the vehicle body and which comprises at least cross members which are connected with side members. Bearings for suspension links are provided on the side members, and a transmission assembly is disposed in the chassis frame between the side members and the cross members. The side member structure of each side comprises in each case two members which are arranged above one another and which have a through-opening for axle shafts of the transmission assembly between one another and converge approximately at the end side and are connected with the cross members. By way of a three-point bearing, the transmission assembly is connected with the cross members and the side members, and the axle shafts of the assembly extend through the through-opening toward the wheel.

9 Claims, 7 Drawing Sheets

SUBFRAME FOR A MOTOR VEHICLE

BACKGROUND AND SUMMARY OF THE INVENTION

This application claims the priority of German Patent Document, filed Mar. 6, 1999, the disclosures of which is expressly incorporated by reference herein.

The invention relates to a subframe for a motor vehicle, particularly for a rear axle of a motor vehicle, having a chassis frame which can be fixed on the vehicle body, including cross members which are connected with side members, bearings for suspension links provided on the side members, and a transmission assembly arranged in the chassis frame between the side members and the cross members.

From German Patent Document DE 41 29 538 C2, a subframe is known which comprises side parts extending in the longitudinal direction of the vehicle and cross members arranged with respect to the side parts, which cross members are connected with one another. The side parts have bearings for suspension links of a wheel suspension and one cross member has a bearing for a rear axle differential gear.

It is an object of the invention to provide a torsion-resistant stable subframe for a motor vehicle which can be fastened as an assembly unit on the vehicle body with the wheel suspension, the brake module and possibly the transmission assembly on the vehicle body as a whole.

According to the invention, this object is achieved by providing a subframe of the above-noted type, wherein one side member structure of each side in each case has two members which are arranged one above the other and which have a through-opening for axle shafts of the transmission assembly between one another and converge approximately at end sides thereof and are connected with the cross members, the transmission assembly being connected by way of a three-point bearing with the cross members and side members, and with the axle shafts of the transmission assembly extending through the through-opening toward the wheel.

A subframe according to the invention is provided which has two side members which are arranged one above the other and have between one another a through-opening for fitting through axle shafts of a transmission assembly. The members of one side converge approximately at end sides thereof and are connected with the cross members, the transmission assembly being held by way of a three-point bearing at the cross members and the side members. The axle shafts of the assembly extend freely through the through-openings toward the wheel.

As the result, a subframe is advantageously formed which has a rigid high-strength connection for the bearing of the swivellable wheel suspensions and for a stable bearing of the rear axle differential gear.

The arrangement of two tube-shaped side members of one side can be adapted to the space requirements in the vehicle as well as to the conditions of the wheel suspension because, as the result of corresponding angled bendings, these side members can be partially situated at different spatial planes.

As a result, it becomes possible that one bottom side member, at a forward end side in relation to the driving direction, has in each case a forward bearing, and the additional upper side member has a rearward bearing at a rearward end side for the fastening to the vehicle structure. Furthermore, the bearings can be situated at different horizontal levels, the forward bearings being situated in a deeper plane than the rearward bearings. Because of the fact the side members each have angled bends at least in one horizontal and at least in one vertical plane, the through-openings as well as the bearing points for the wheel suspensions and the bearing points for the transmission assembly can be defined and disposed directly on the side members and cross members.

The through-openings for the axle shafts are formed in that at a forward free end in relation to the driving direction, the upper side member is bent at an angle with respect to the lower side member and is connected with its front-side end to the lower side member. Furthermore, the two rearward free end pieces are situated one above the other and are connected with one another along a common path. The space between the two side members is constructed approximately in the shape of a square, the axle shaft having sufficient clearance in this through-opening.

The tube-shaped side members are, for example, components formed by the application of internal high pressure so that the diameters of the tubes can be adapted to the space conditions and to the strength requirements.

The cross members each have a two-shell construction and consist of two assembled supporting profiles enclosing a hollow space, whereby the manufacturing of the members is simplified and a light-weight component is formed.

Particularly for the cross member which is situated in the front in the driving direction, two U-profiles or two hat-type profiles are used and, for the rearward cross members, two profiles are used, one profile being constructed as an angle profile and the other being constructed as a U-shaped profile.

According to the invention, for example, drawn cross members, cast cross members or cross members components formed by the application of internal high pressure are also contemplated.

The rearward cross member has an exterior recess in a center area for a portion of a spare wheel pan, whereby the member cross-section changes from the end-side square or rectangular cross-section to a central triangular cross-section.

On the upper and lower side members, bearing brackets are fastened for bearings of control arms of an upper suspension link, in the lower side member, additional bearing brackets being provided for bearings of an A-arm of a lower suspension link.

The rear axle differential gear or the transmission assembly is held in the chassis frame of the subframe by way of a three-point bearing, the rearward cross member preferably having two bearings and the forward cross-member preferably having one bearing.

So that, in a simple manner, the housing neck of the rear axle differential gear arranged between the cross-members can be guided toward the front, in relation to the driving direction, and can be disposed in a predetermined plane, the forward cross-member is provided with an approximately central receiving depression, whereby the two profiles forming the member have a correspondingly bent design, and a concave depression is obtained.

So that, in a simple manner and without additional brackets and reinforcements, the bearings can be arranged on the subframe for the fastening on the vehicle body, the free ends of the side members have a flat shape, so that two parallel spaced surfaces are obtained. The bearing will then be held in a semicircular front-side recess and will be fastened by way of a weld.

Other objects, advantages and novel features of the present invention will become apparent from the following detailed description of the invention when considered in conjunction with the accompanying drawings.

DETAILED DESCRIPTION OF THE DRAWINGS

The subframe 1 for a motor vehicle comprises essentially lateral side member structures 2, 3 which are connected with one another by way of two mutually spaced cross members 4, 5. In this subframe 1 formed of the side members 2, 3 and the cross members 4, 5, a transmission assembly G, such as a rear axle differential gear, is held in a three-point bearing 6, 7, 8. On the side members 2, 3, bearing brackets 9, 10 are provided for control arms 11, 12 of upper suspension links and additional bearing brackets 13, 14 for a control arm 15 or control arms of a lower suspension link.

The side member structure 2, 3 of a vehicle side each has supports which are arranged above one another and preferably consist of two tubes 2a, 3a which have angled bends at least in one horizontal and at least one vertical plane such that a through-opening 16 is obtained between the two tubes 2a and 3a which are the actual side members. These through-openings 16 are used for the lead through of axle shafts 17, 18 of the transmission assembly G toward the vehicle wheel.

The fastening of the subframe 1 on the vehicle body takes place by four bearings 19, 21 and 20, 22 which are each arranged at the end side of the side member 2a, 3a. Thus, the lower side member 3a, at a forward end in relation to the driving direction F, has forward bearings 19, 21, and the upper side member 2a, at a rearward end in relation to the driving direction, has rearward bearings 20, 22. These bearings are arranged at different horizontal levels X—X and Z—Z.

The side members 2a, 3a each have bent-away sections 2b and 3b which are directed against one another and form the through-opening 16 between one another. Thus, the upper side member 2a strikes by means of its forward free end 23 against the lower side member 3a and is connected with it by way of a weld. The rearward free end 23a of the upper side member 2a is connected along a path with the free end 24 of the lower side member 3 while being situated above the lower side member 3.

The tube-shaped side members 2, 3 are components formed by the application of an internal high pressure. Drawn tubes or castings are also contemplated. A light metal or iron material can also be used as the material. Likewise, profiles may be used. The selection of the materials and the composition of the components takes place corresponding to the respective requirements.

For the fastening and the receiving of the bearings 19 to 22, the side members 2, 3 are provided with a round cross-section and are in each case pressed flat on the end side, so that a certain height h remains. The bearing 19, 20, 21 and 22 is inserted in a semicircular front-side receiving device 25 and is fixed, for example, by means of a welding.

The forward cross member 4 is connected directly as well as additionally by way of at least one bracket plate 26 with the side member 2a, 3a.

Figure 7:
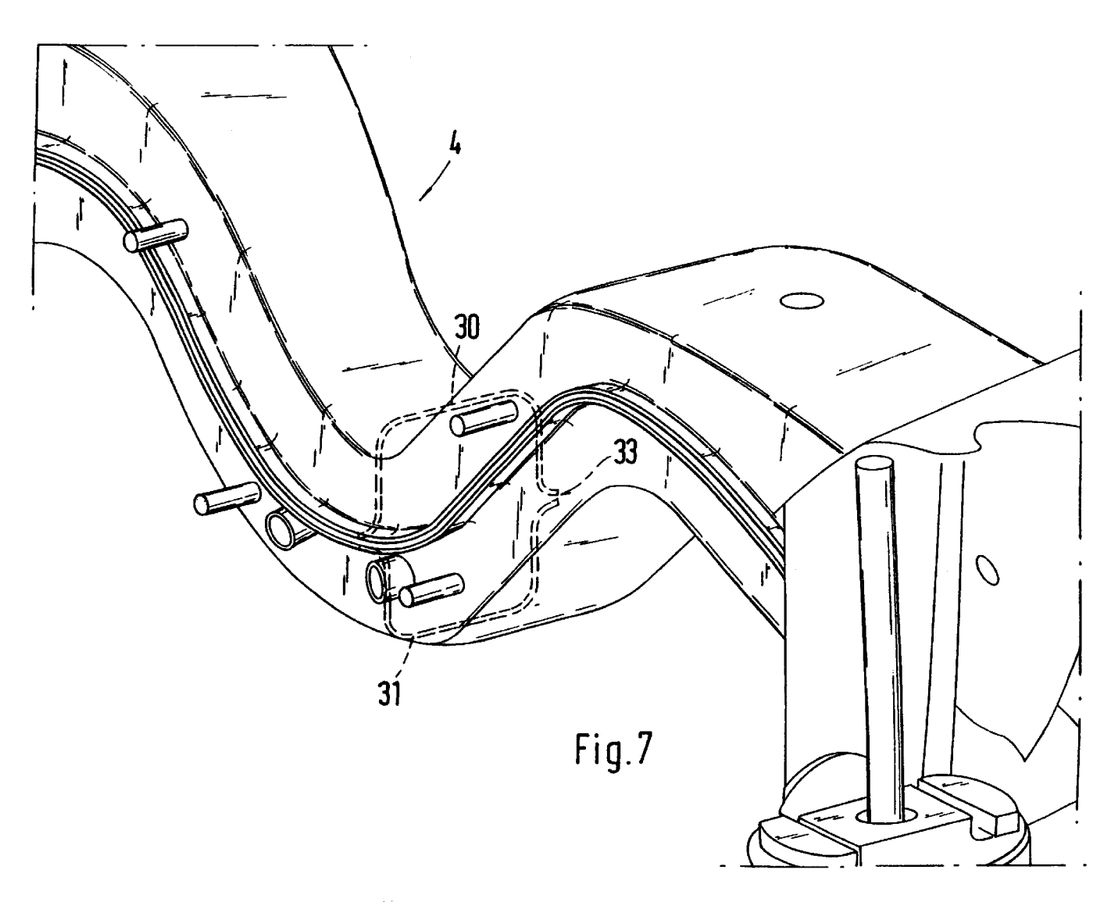
FIG. 7 is a sectional representation of the forward cross member comprising of two U-profiles.

The two cross members 4, 5 each have a two-shell construction and consist of profiles. In its cross-section, the forward cross member 4 consists of two U-profiles or hat-type profiles 30, 31 which, when fitted together, form a member profile having a cavity and are connected with one another at the bent edges 33.

In the longitudinal center plane L—L of the vehicle, the cross-member 4 has a receiving depression 34, which is open toward the top, for a housing neck of the transmission assembly G. Below this receiving depression 34, bearing brackets of the bearing 6 are provided in which the transmission assembly G is held.

Figure 1:
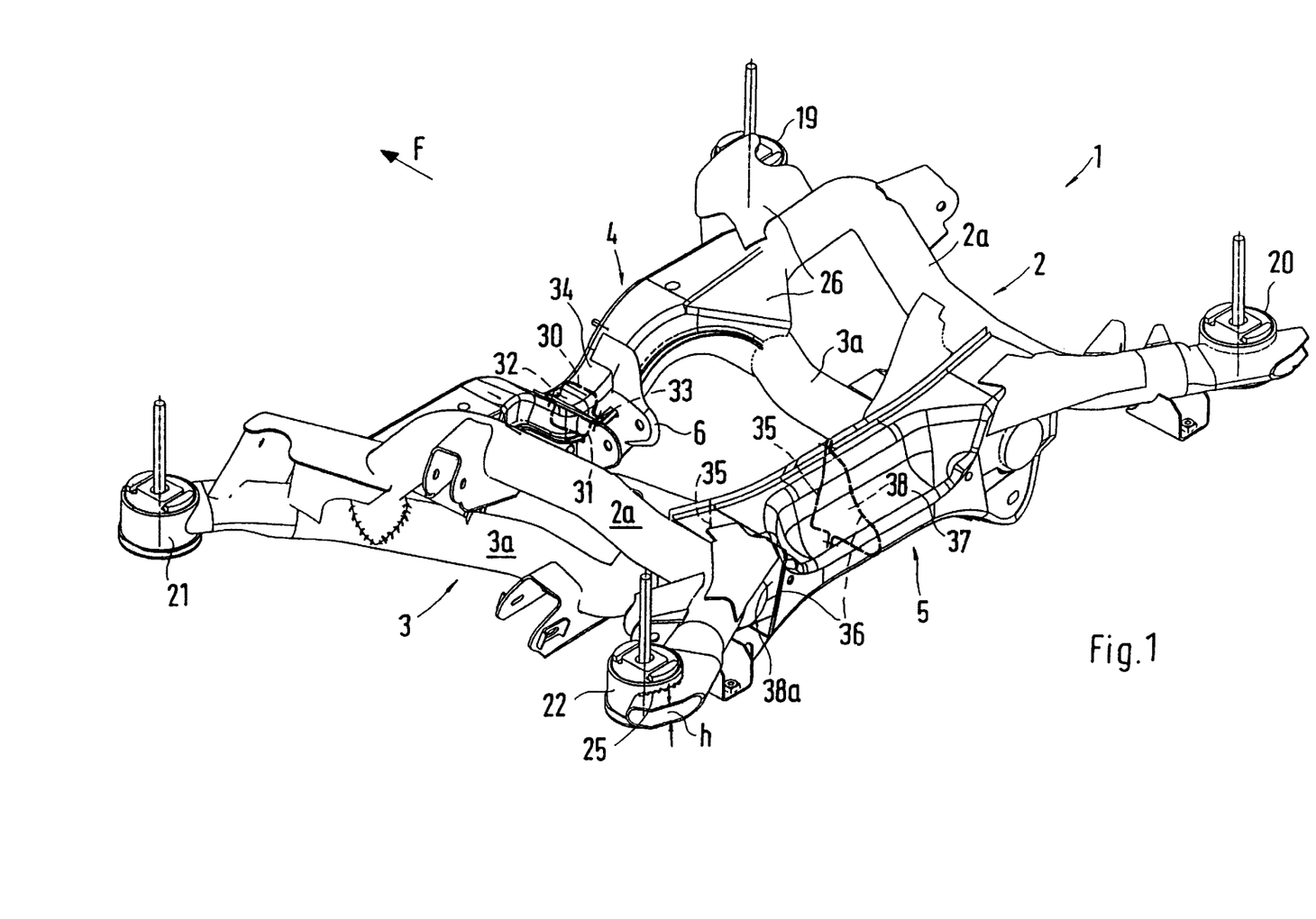
FIG. 1 is a diagrammatic representation of a rear-axle subframe constructed according to a preferred embodiment of the intention.
Figure 2:
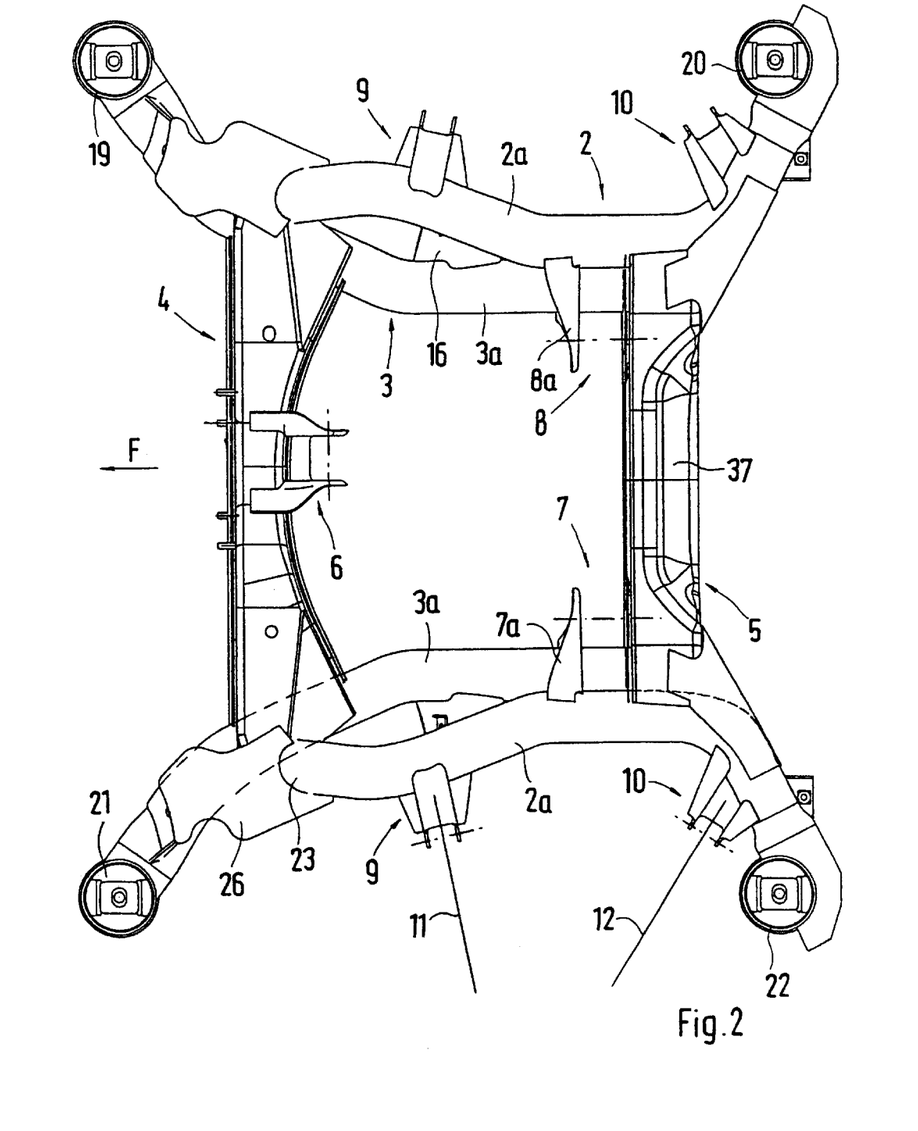
FIG. 2 is a top view of the subframe.
Figure 3:
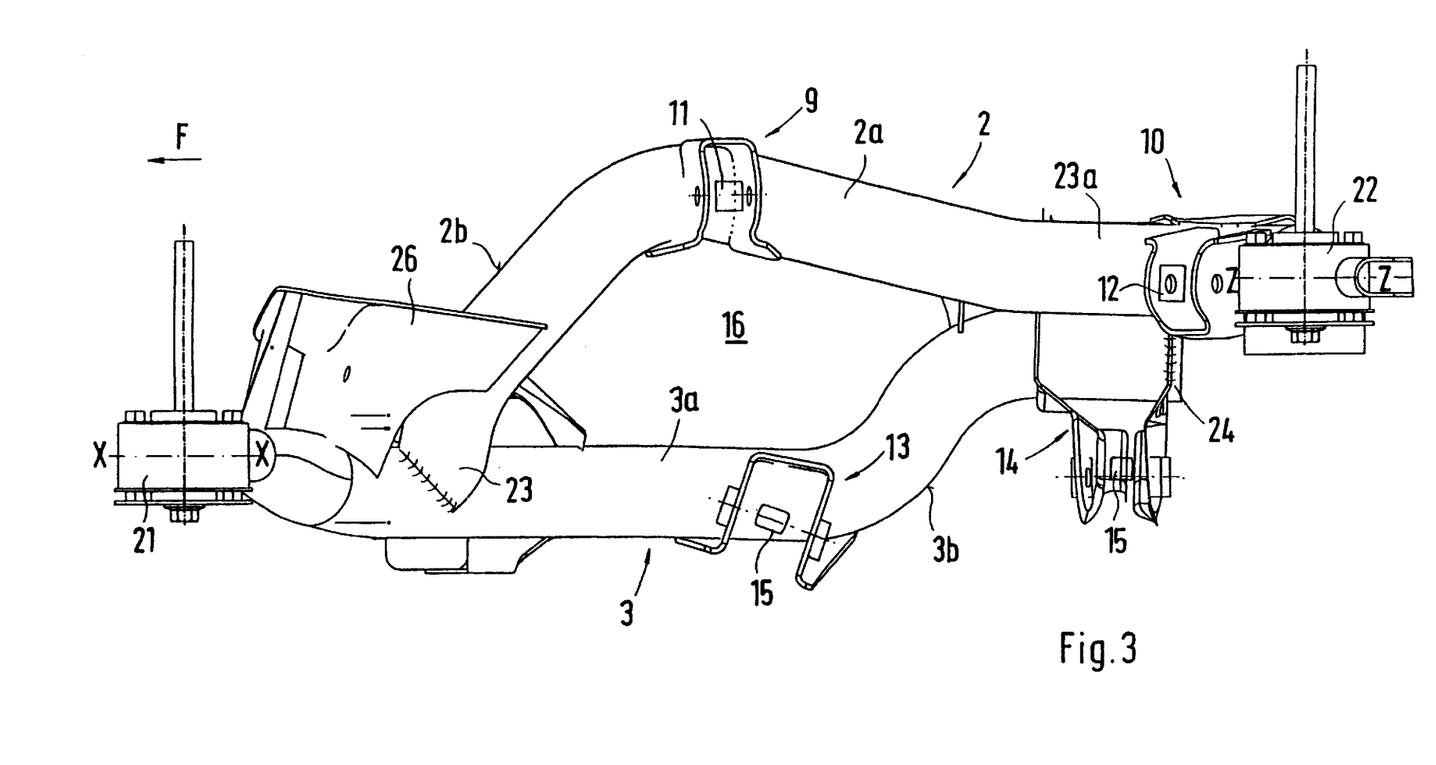
FIG. 3 is a lateral view of the subframe.
Figure 4:
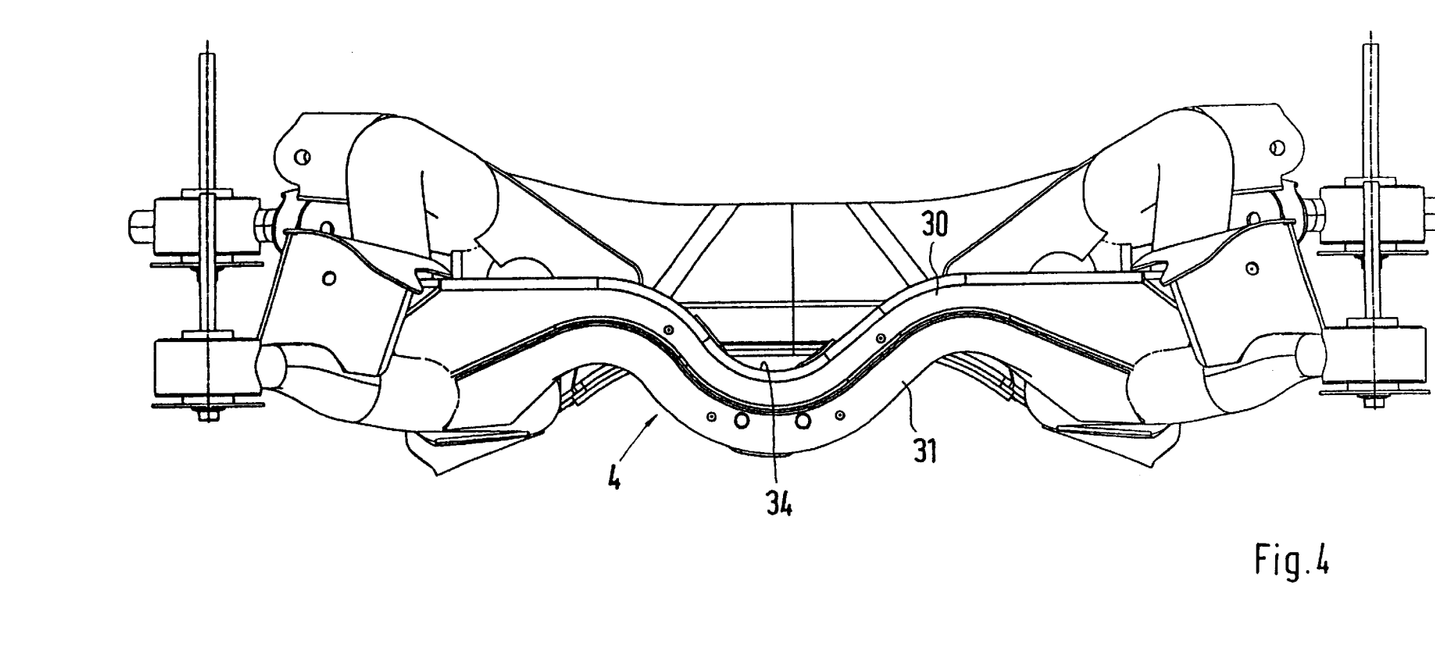
FIG. 4 is a frontal view of the subframe.
Figure 5:
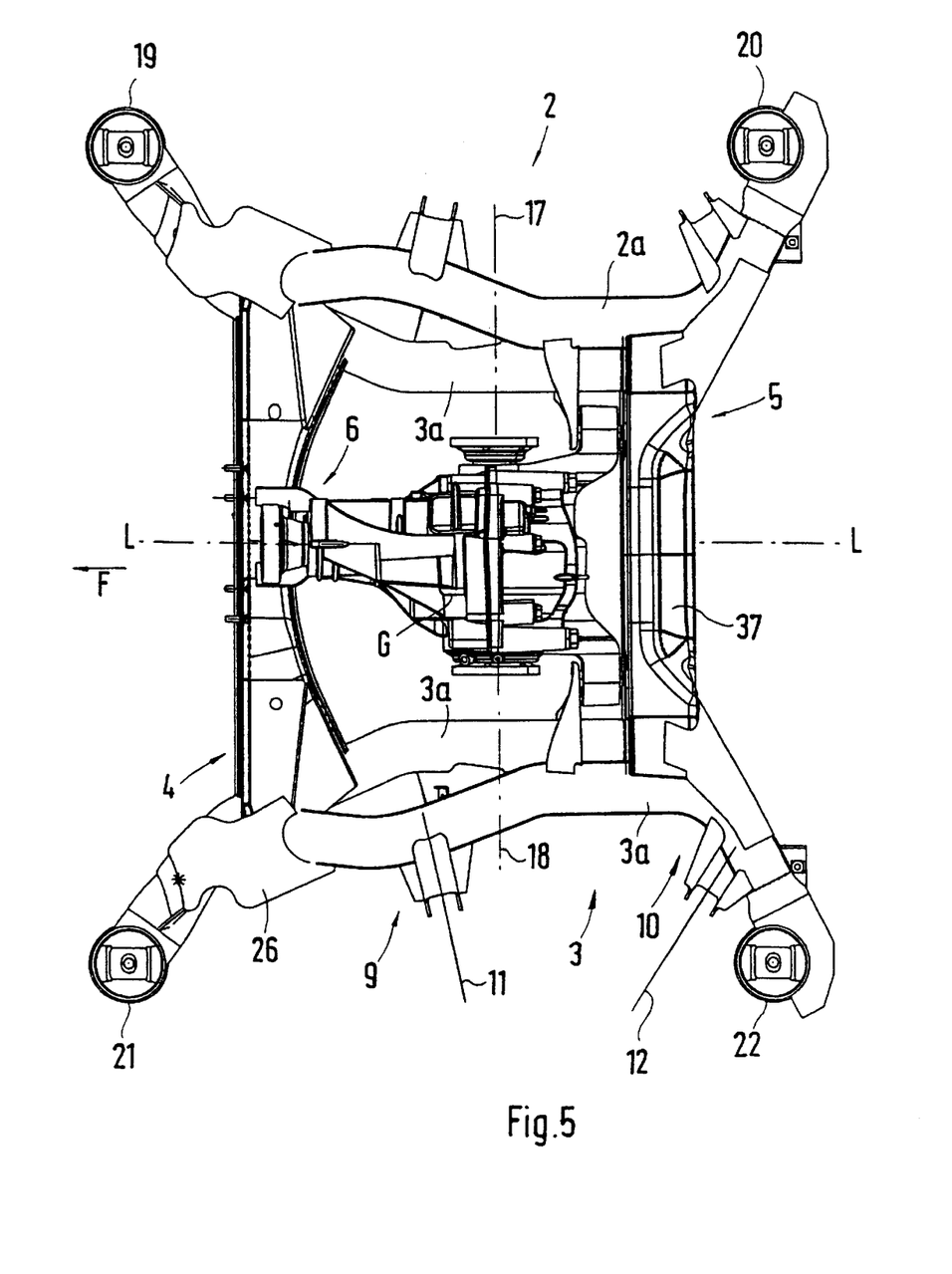
FIG. 5 is a top view of the subframe with the transmission assembly.
Figure 6:
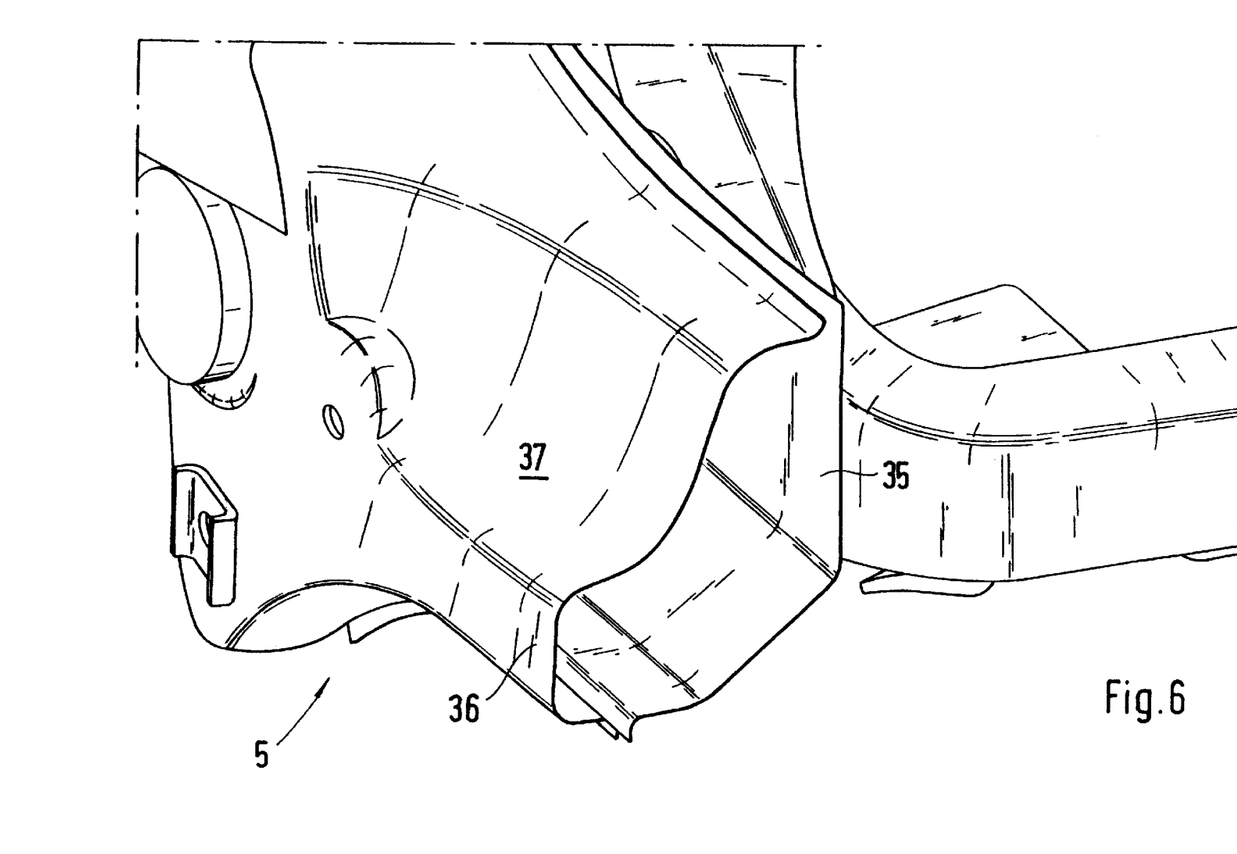
FIG. 6 is a sectional representation of the rearward cross member comprised of two profiles.

The rearward cross member 5 consists of two profiles 35, 36 which are assembled. The interior angle profile 35 has a long vertical leg and another narrower horizontal leg with a projection. The outer profile 36 is constructed as a U-profile and is deformed in a center area of the cross member 5 by means of an indentation 37 so that, instead of a square cavity 38a at the ends, a triangular cavity 38 is formed in the center.

The bearings 7, 8 of the transmission assembly G are held between bearing brackets 7a and 8a on the upper side members 2a of each side and the rearward cross member 5.

Bearing brackets 9, 10 for the swivellable bearing of opened-up control arms 11, 12 are arranged on the upper side member 2a. The lower control arm plane of the suspension control arm is swivellably held, for example, as an A-arm 15, in the bearing brackets 13, 14. The bearing bracket 14 is simultaneously used for fastening the lower side member 3a. The bearing bracket 14 is connected with a free end 23a of the upper side member 2a and simultaneously has a form-locking receiving device for connection with a free end 24 of the lower side member 3a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A suspension subframe for a vehicle that can be mounted on a body of the vehicle comprising:

front and rear cross members, side members, to which the cross members are connected, the side members and the cross members being connected so that a transmission unit can be positioned in the subframe between the side members and the cross members, bearing elements for suspension link control arms provided on said side members, a three-point bearing on the cross members and the side members for the transmission unit, and rearward and forward bearings on said side members by which the subframe can be fastened to the body of the vehicle, wherein each of said side members is formed by two structural members, an upper one of the two structural members being positioned nearly on top of a lower one of the two structural members, the two structural members defining a through opening for an axle shaft of the transmission unit therebetween, wherein the two structural members are joined approximately at their ends and are connected to the cross members, wherein rearward ends of the structural members, viewed in a direction of travel, lie approximately one on top of the other over a common stretch and are connected to one another, wherein the front cross member is connected to the structural members, wherein the structural members define gaps in at least one horizontal plane and at least one vertical plane, resulting in the through opening on either side, wherein ends of the structural members are flat in shape with an elevation to allow them to hold and be connected to the rearward and forward bearings, and are equipped with recesses corresponding to appropriate rearward and forward bearings, wherein the front cross member is equipped with a receiving depression for a housing stem of the transmission unit (G) and a first bearing of said three-point bearing for the transmission unit is located at the receiving depression on an inner side of the front cross member, wherein second and third bearings of said three-point bearing include the rear cross member and bearing elements on the upper one of the structural members, and wherein one of the bearing elements for suspension link control arms is connected to the upper one of the two structural members at its rearward end, and at the same time is equipped with a form-fitting depressed area designed to hold the rearward end of the lower one of the two structural members.

2. The suspension subframe in accordance with claim 1, wherein the lower one of the two structural members is equipped at an end thereof with a respective one of said forward bearings and the upper one of the two structural members is equipped with a respective one of said rearward bearings for mounting the subframe to the body of the vehicle, and wherein the rearward and forward bearings lie within different horizontal elevation planes, with the forward bearings lying within a lower plane than the rearward bearings.

3. The suspension subframe in accordance with claim 1, wherein the upper one of the two structural members is bent at an angle away from the lower one of the two structural members and, at its forward end, is connected to the lower one of the two structural members.

4. The suspension subframe in accordance with claim 1, wherein the structural members are comprised of components made using an internal high-pressure metal forming process.

5. The suspension subframe in accordance with claim 1, wherein the front cross member has a dual shell and is comprised of sections that are U-shaped in cross section, and wherein said sections, when connected to one another, form a closed member profile with a hollow space.

6. The suspension subframe in accordance with claim 1, wherein the rear cross member has a dual shell and is comprised of an inner angle section and an outer U-section which enclose an approximately triangular hollow space on both sides of the longitudinal center plane of the vehicle and, in areas of ends thereof, enclose an approximately rectangular hollow space as a result of an indentation.

7. The suspension subframe in accordance with claim 6, wherein the outer U-section possesses an outer indentation for a spare tire depression which extends, on both sides of the longitudinal center plane of the vehicle, with the triangular hollow space.

8. The suspension subframe in accordance with claim 1, wherein some of the bearing elements for suspension link control arms of an upper wheel guiding element are fastened to the upper one of the two structural members, and wherein additional bearing elements for bearings of an A-arm of a lower wheel guiding element are provided on the lower one of the two structural members.

9. The suspension subframe in accordance with claim 1, wherein the front cross member is connected to each of the structural members by way of bracket plates.

\* \* \* \* \*